INVENTORS
WALLACE K. L. CHING
JAMES E. COTTRELL, JR.
JOHN D. SHERMAN
HELMUT T. WEINMANN
BY
J. O. Tresansky
ATTORNEY INVENTORS
WALLACE K. L. CHING
JAMES E. COTTRELL, JR.
JOHN D. SHERMANN
HELMUT T. WEINMANN BY J. O. Tresansky
ATTORNEY

TIME-DIVISION MULTIPLEX WITH SYNCHRONIZATION SYSTEM

Filed July 15, 1966 5 Sheets-Sheet 4

INVENTORS
WALLACE K. L. CHING
JAMES E. COTTRELL, JR.
JOHN D. SHERMAN
HELMUT T. WEINMANN
BY
J. O. Threadgill (signature)
ATTORNEY INVENTORS
WALLACE K. L. CHING
JAMES E. COTTRELL, JR.
JOHN D. SHERMAN
HELMUT T. WEINMANN
BY
J. O. Tresansky
ATTORNEY United States Patent Office 3,484,555
Patented Dec. 16, 1969

3,484,555
TIME-DIVISION MULTIPLEX WITH SYNCHRONIZATION SYSTEM

Wallace K. L. Ching, Takoma Park, and James E. Cottrell, Jr., Wheaton, Md., and John D. Sherman, Arlington, Va., and Helmut T. Wienmann, Munich, Germany, assignors to the United States of America as represented by the Secretary of the Navy Filed July 15, 1966, Ser. No. 565,499
Int. Cl. H04j *3/00, 3/06;* H04l *7/00*
U.S. Cl. 179—15 8 Claims

ABSTRACT OF THE DISCLOSURE

The invention is a time-division multiplexing system having a receiver which provides both bit and frame synchronization. The bit synchronization circuit includes a data stream transition detector for determining the transitions in the incoming data stream. The transition detector controls the output of a local oscillator with the result that the oscillator supplies a phase modulated high frequency pulse train to a first frequency divider, the output of which is the desired bit synchronization signal. The output of the first frequency divider is also fed to a second frequency divider, which generates frame synchronization pulse when the frame synchronization circuit detects an out-of frame condition in the incoming data stream. A synchronization error weighting circuit is included to bias the frame synchronization circuit so that it does not overcorrect for isolated single bit errors in the incoming frame synchronization signal.

The invention described herein may be manufactured and used by or for the Government of the United States of America for governmental purposes without the payment of any royalties thereon or therefor.

This invention relates generally to multiplex systems, and more particularly to a pulse code modulation, time-division multiplex system having improved bit and frame synchronization circuits in the demultiplexer. Although the present invention is generally applicable to pulse communication systems, it may have applications in sampled data automatic control systems.

There are two methods to provide multichannel capability. One is termed frequency-division multiplexing and the other is time-division multiplexing. The term frequency division is descriptive of the partitioning of the base band into a number of channels, one per subcarrier. Orthogonality of the subcarriers is obtained through their distribution in frequency. Demultiplexing is achieved by linear filtering of the multiplexed signal to separate individual subcarriers. On the other hand, time-division multiplex systems accomplish a multichannel, transmission capability by sampling a number of continuous input signals at distinct time intervals. The samples from individual message channels are then transmitted sequentially so that only one circuit from message source to receiver is completed at any given instant.

Frequency-division multiplexing has a number of disadvantages. The most serious disadvantages are due to phase error and cross-talk. Time-division multiplexing, however, is remarkably free from interference. Additionally, multichannel transmission is accomplished with a minimum amount of circuitry since the filters required in frequency-multiplexing are eliminated. Circuit reliability and temperature stability are also increased because digital electronics are employed. It is necessary, however, that the receiving apparatus operate in substantially perfect synchronism with the transmitting apparatus for correct reconstitution of the message and for correct distribution of the several channel messages. It is therefore necessary that the receiving apparatus operate at the same frequency and maintain a given phase relation to a very high degree. Frequency synchronization has in the past been accomplished most usually with a "slave" oscillator in the receiving apparatus. Such a circuit may be characterized as being an "analog" circuit as opposed to digital or binary circuits. It is a difficult circuit to design and complex in its execution. In general, because of the superior reliability, stability and low-noise characteristics of digital circuitry, it is highly desirable to accomplish frequency stabilization without resort to a slave oscillator. Phase synchronization of the several channel messages is most usually accomplished by transmitting a marker or "frame sync" pulse with each message unit. The frame sync pulses are of a recurring nature and have a preassigned sequence which the receiving apparatus can recognize and thereby maintain correct frame synchronism. There are a number of ways known in the prior art for recognizing an "out-of-frame" condition in the receiving apparatus and "reframing" or bringing the receiving apparatus back into frame synchronization. The present invention is concerned with minimizing the circuitry required for accomplishing the reframing operation.

It is therefore an object of the instant invention to provide a time-division multiplex system having improved synchronization circuits.

It is another object of this invention to provide frequency or bit synchronization in a pulse communication system by using only digital circuitry.

It is a further object of the invention to provide frame synchronization in a time-division multiplex system with a minimum amount of circuitry.

According to the present invention, the foregoing and other objects are attained by providing within the demultiplexer of the receiving apparatus a bit synchronization circuit which continually adjusts the phase of the receiver clock to synchronize it with the incoming data stream. This is accomplished digitally by constantly attempting to "line up" the ONE-ZERO transitions of the receiver clock with those of the incoming data stream. There is further provided a frame synchronization circuit which continually monitors the assumed position of the frame sync pulse in the incoming data stream to detect an out-of-frame condition and perturb the demultiplexer time countdown to affect reframing of the incoming data stream when an out-of-frame condition is detected.

The specific nature of the invention, as well as other objects, aspects, uses and advantages thereof, will clearly appear from the following description and from the accompanying drawing, in which.

Figure 3A:
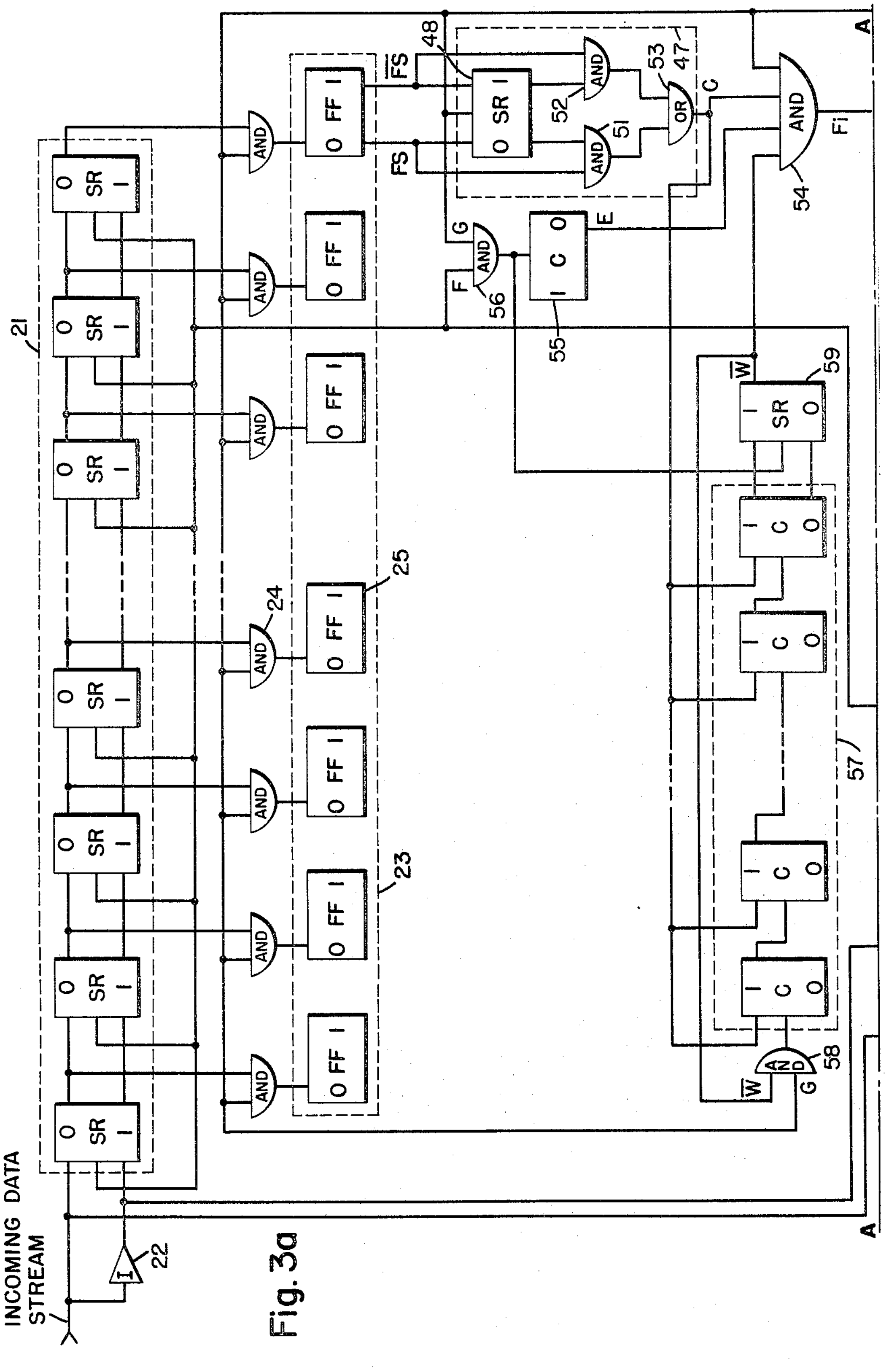
Figure 3B:
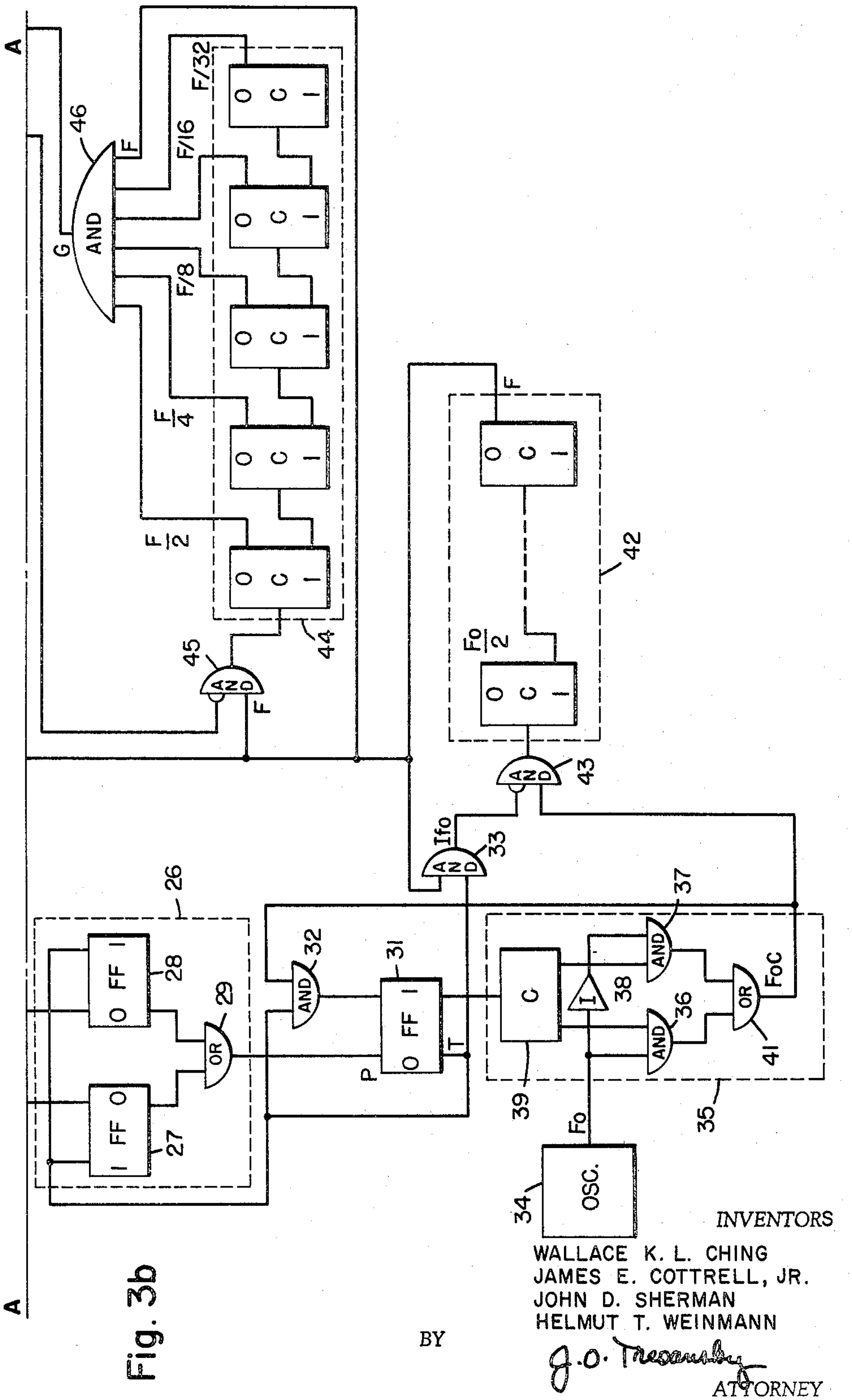
Figure 4:
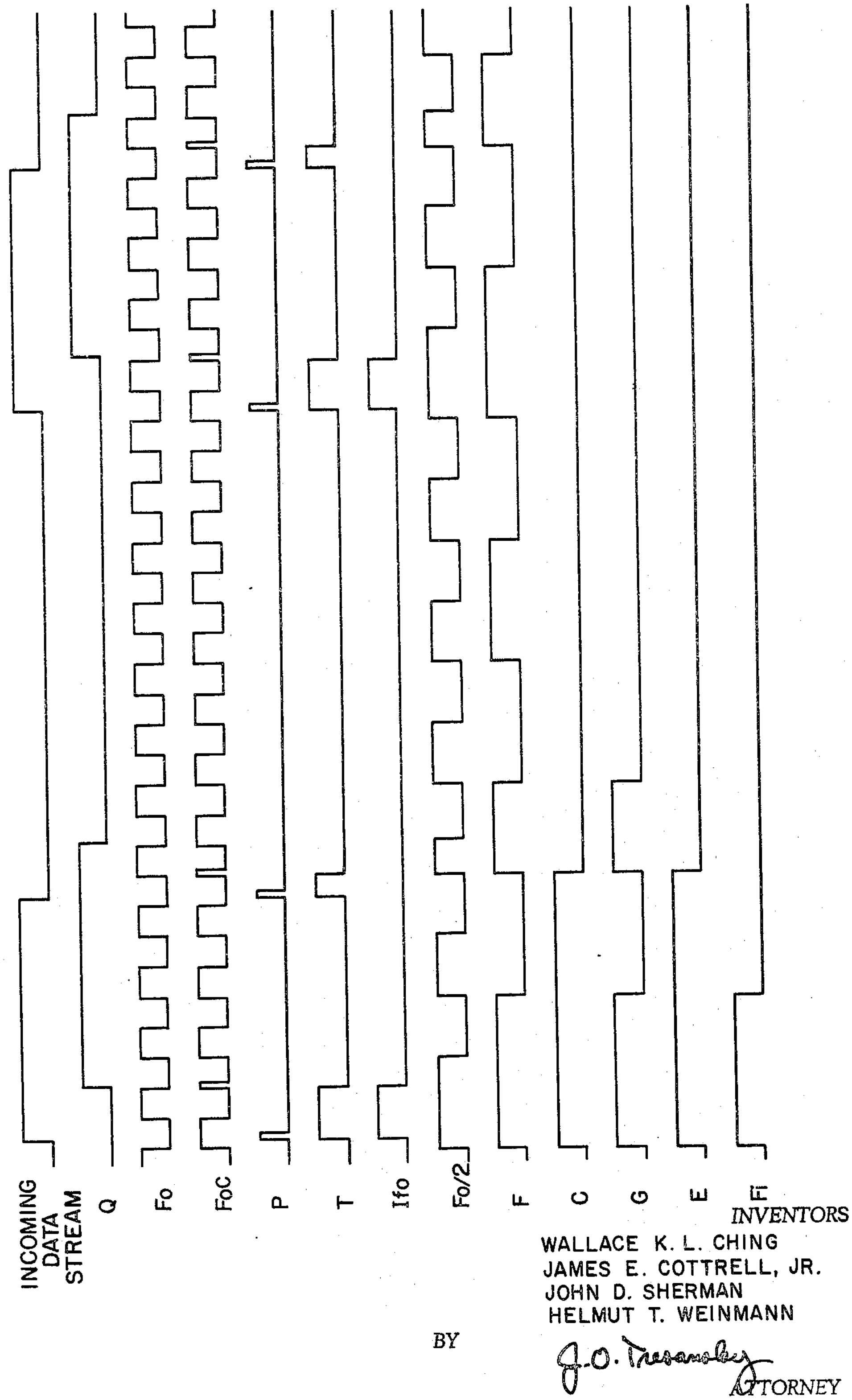

FIGS. 3*a* and 3*b* together are a logic diagram of a time-division demultiplexer which incorporates the bit synchronization and frame synchronization circuits according to the invention; and FIG. 4 is a pulse diagram for the system shown in FIGS. 3*a* and 3*b*.

Figure 1:
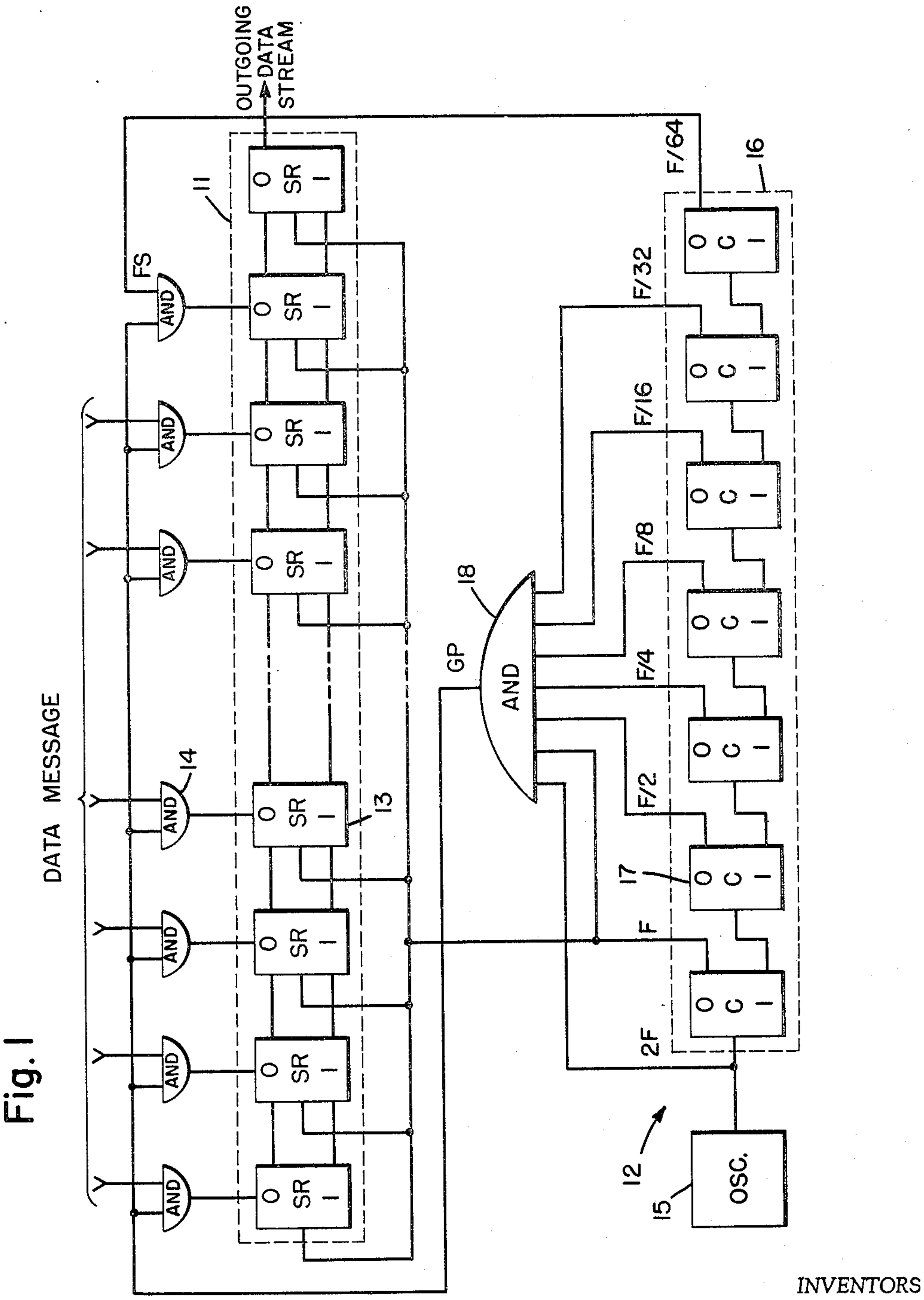
FIG. 1 is a logic diagram of a time-division multiplexer and clock useful in practicing the invention.

Referring now to the drawing, and more particularly to FIG. 1, the multiplexer basically comprises a serial shift register 11 and a clock 12. For convenience of illustration, the data message is assumed to consist of thirty-one bits. The "frame" or transmitted message unit consists of the data message plus a frame sync pulse, the latter being designated in the drawing by the symbol FS. In general, however, the data message consists of $2^n-1$ bits and, together with the frame sync pulse, forms a frame of $2^n$ bits. for the assumed condition of $n=5$ or a data message of thirty-one bits, shift register 11 is composed of thirty-three shift register stages 13. Each shift registered stage 13 may be, for example, a symmetrically triggered, steered bistable multivibrator. The thirty-one bits of the data message are simultaneously gated by a gate pulse GP into the first thirty-one shift register stages 13 in parallel through AND gates 14 every $32/F$ seconds, where F is the basic clock frequency. Each AND gate performs the logical AND function; that is, an output will be provided only when all the inputs are present. The frame sync pulse is gated into the thirty-second shift register stage at the same time as the data message is gated into the preceding thirty-one stages. The frame is then serially shifted out of register 11 over the transmission line at a frequency of F c.p.s. thereby forming the data stream. A thirty-third shift register stage is provided in register 11 as a buffer between the first thirty-two shift register stages and the transmission line. This buffer stage provides isolation of the transmission line during the time a data message is being gated into shift register 11 thereby insuring the proper timing of the non-return-to-zero data stream. As a given frame of the data stream is serially shifted out of the shift register 11, the logical value ZERO is shifted into the register stage by stage; therefore, when the gate pulse GP occurs, the first thirty-two shift register stages are all initially ZERO.

Figure 2:
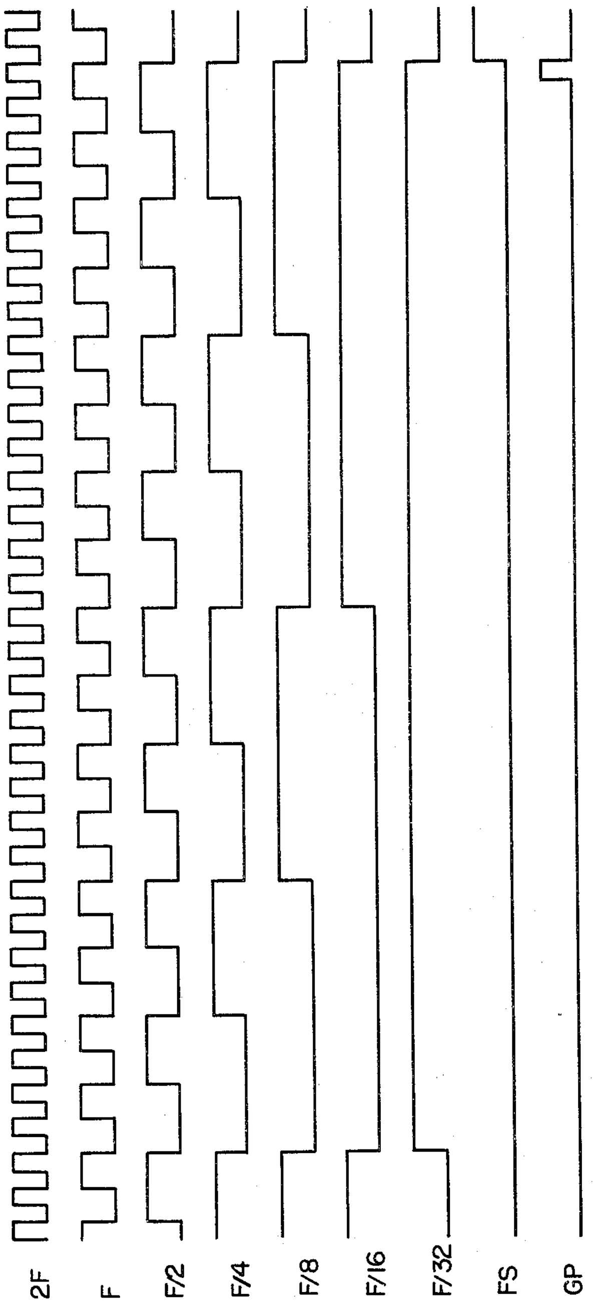
FIG. 2 is a pulse diagram for the multiplexer clock shown in FIG. 1.

Clock 12 comprises an oscillator 15 and a frequency divider 16. Oscillator 15 may be, for example, a free-running, astable multivibrator and preferably has a frequency which is twice the basic clock frequency F. The frequency divider 16 is a binary ripple-through counter which comprises seven counter stages 17. Each counter stage 17 may be, for example, a symmetrically triggered bistable multivibrator. The output of the first stage of the frequency divider is the basic clock frequency F and is connected to the shift inputs of each stage of shift register 11. The gate pulse GP is formed by AND gate 18 which has as its inputs the outputs of the first six stages of frequency divider 16 and the output of oscillator 15. The formation of gate pulse GP is graphically depicted in the pulse timing diagrams of FIG. 2. Note that GP occurs only when 2F, F, $F/2$, $F/4$, $F/8$, $F/16$, and $F/32$ are all positive where, for the sake of convention, positive is assumed to be logical or binary ONE. Examination will show that GP occurs after all the data information in shift register 11 has been shifted out by the F pulses. The last stage of frequency divider 16 produces an output frequency equal to $F/64$ and is used as the frame sync pulse FS. As is partially illustrated in FIG. 2, the pulse FS alternates between logical ZERO and ONE for successive frames. This gives rise to a "winking" frame sync pulse which may be readily distinguished from the data message by the demultiplexer.

The receiving apparatus includes the demultiplexer shown in FIGS. 3*a* and 3*b*. The incoming data stream is serially shifted into a thirty-two stage shift register 21 at the bit frequency of F c.p.s. To permit the use of a single transmission line such as a radio link, an inverter 22 is employed to derive the logical complement of the data stream. Thus, the first stage of shift register 21 is supplied with both the data stream and its complement. Once every frame period, a gate uplse G gates the output of each stage of shift register 21 into a corresponding stage of output register 23 through AND gates 24. Each stage 25 of register 23 is here represented as a flip-flop which may be, for example, an asymmetrically triggered bistable multivibrator. The outputs of the thirty-two stages of output register 23 then represent the thirty-two parallel data channels.

The multiplexer and demultiplexer are each controlled by separate clock oscillators, and each oscillator output is counted down to provide the data stream bit rate F c.p.s. for its respective part of the system. Bit synchronization is therefore required to maintain the relative phase relationship of the demultiplexer clock with the incoming data stream. This is provided by a bit synchronization circuit which includes a data stream transition detector 26. Detector 26 comprises two flip-flops 27 and 28 which are set by a ZERO-to-ONE transition of the incoming data stream and its complement, respectively. The outputs of flip-flops 27 and 28 are combined in OR gate 29. OR gate 29 performs the logical inclusive OR function; that is, it provides an output when any one of its inputs are present. Thus, an output P from OR gate 29 will occur any time there is a ZERO-to-ONE or ONE-to-ZERO transition in the data stream. The output P from OR gate 29 sets flip-flop 31. The ZERO-to-ONE transition of the output of flip-flop 31 is used to reset flip-flops 27 and 28; therefore, P has a very short duration and occurs as a pulse spike. The output T of flip-flop 31 when set by the P pulse enables AND gate 32 and 33.

The basic clock frequency F in the demultiplexer clock is derived from a much higher frequency $F_o$ of the output of oscillator 34. The output of oscillator 34 is connected to phase inverter 35 which is controlled by flip-flop 31. Phase inverter 35 includes AND gates 36 and 37 which receive as inputs $F_o$ and its complement, respectively, the complement of $F_o$ being derived by inverter 38. AND gates 36 and 37 are enabled by the output Q and the complement output, respectively, of counter stage 39. Thus, at any given time one of AND gates 36 and 37 is enabled while the other is inhibited. The outputs of AND gates 36 and 37 are combined by OR gate 41 which produces an output $F_oC$. $F_oC$ will be the same as $F_o$ if AND gate 36 is enabled while AND gate 37 is inhibited and the complement of $F_o$ if AND gate 36 is inhibited and AND gate 37 is enabled. Thus, the phase of $F_oC$ will be shifted 180° or not depending on the state of counter stage 39.

Assume now that flip-flop 31 has been set due to a transition in the data stream. The output of OR gate 41 is connected to an input of AND gate 32. Since AND gate 32 is enabled by the output T of flip-flop 31, its output is the next $F_oC$ pulse. This output is used to reset flip-flop 31. The complement output of flip-flop 31 is connected to the input of counter stage 39. The ZERO-to-ONE transition of the complement output of flip-flop 31 toggles counter stage 39 causing it to assume the state opposite to the one it was just in. The result is that $F_oC$ is shifted in phase. This may be clearly seen in FIG. 4. Note that P occurs at every transition of the non-return-to-zero, incoming data stream. P sets flip-flop 31 to begin the T pulse. The next following $F_oC$ pulse resets flip-flop 31 ending the T pulse and causing counter stage 39 to toggle changing the logical value of Q. This in turn shifts the phase of $F_oC$.

The output of $F_oC$ of phase inverter 35 is supplied to the input of frequency divider 42 by way of AND gate 43. The output of frequency divider 42, which again comprises a ripple-through binary counter, is the basic bit frequency F. The number of stages of frequency divider 42 depends on the preciseness of bit synchronization required and the frequency $F_o$ of oscillator 34. For convenience, two stages are assumed. Each time $F_oC$ changes phase, F will either be retarded or advanced. Consider the timing sequence hypothesized in FIG. 4. Here, F occurs before the first data stream transition. It is therefore necessary to retard F so as to obtain better alignment. Thus, the logical truth table would require the next count of frequency divider 42 to be inhibited whenever F occurs prior to a data stream transition. This is accomplished by AND gate 33. Whenever T is a logical ONE due to a data stream transition and F is also a logical ONE, the output I*fo* of AND gate 33 inhibits AND gate 43 thereby preventing the next $F_oC$ pulse from being counted. The result is that F is stretched or retarded as shown in FIG. 4. Now, at the next data stream transition, F occurs slightly later. It thus becomes necessary to advance F. In other words, whenever F is logical ZERO at the time of a data stream transition, F should be advanced. This is accomplished by counting the extra $F_oC$ pulse which occurs when the phase of $F_oC$ is shifted. This happens because AND gate 33 is inhibited by F thereby enabling AND gate 43 allowing $F_oC$ to be counted in frequency divider 42. The result as shown in FIG. 4 is a contracting or advancing of clock pulse F. Note that if, as hypothesized by the pulse diagrams in FIG. 4, the frequency of F is exactly equal to that of the data stream a "steady state" condition will arise in which the phase corrections will alternate between advances and retards for each transition.

Because the frame synchronization channel alternates between ONE and ZERO in consecutive frames, a transition occurs in the data stream at least once every two frames. This extreme case occurs when two successive frames are of the same polarity in every channel slot, including that of the frame sync channel in the second frame. Under this condition, if $n$ is the number of bits in a frame, then the two transitions are separated by $(2n-1)$ bits. Suppose the maximum expected difference between the period of a bit in the incoming data stream and the period of F is $\Delta T$ seconds in magnitude. The correction increment $\delta$, which is determined by the number of stages in frequency divider 42, must be at least equal to $(2n-1)\Delta T$ if F is to follow the incoming data stream without dropping a data stream bit. In order to establish the desired phase relationship between the data stream and F under all initial conditions, $\delta$ must be greater than $(2n-1)\Delta T$. How much greater depends upon the desired speed with which the synchronization is to be established. All other clock signals in the demultiplexer are derived from the synchronized clock frequency F; therefore, the choice of oscillator frequency $F_o$ depends only upon the correction increment size desired.

The data stream can be expected to contain transition jitter generated by noise in the transmission medium. Since the jitter is random, the long term average is zero. Thus, very small correction increments would minimize the possibility of over-correcting for singular phase shifts in the data stream due to jitter. The operation of the bit synchronization circuit may be likened to that of a low-pass filter; it must follow the slowly varying transition phase of the data stream while being relatively insensitive to the noisy jitter which varies randomly from transition to transition. On the other hand, the transient response of this filter must provide a sufficiently rapid initiation of the desired phase relationship.

The output F of frequency divider 42 is used to provide the timing for the formation of the gating pulse G. In principle, the formation of G is similar to the formation of GP in the multiplexer. A frequency divider 44 comprising five counter stages receives F through AND gate 45 as its input. The outputs of each of the counter stages plus F are connected to the inputs of AND gate 46. The output of AND gate 46 is the gate pulse G and has a frequency equal to $F/32$. This pulse, however, must be synchronized such that it will gate all the bits in the data stream into their corresponding channels in output register 23. The frame synchronization circuit accomplishes this by rephasing the count of frequency divider 44 with respect to the data stream until the synchronization signal appears at the output of the frame sync channel. To do this, the output of the frame sync channel, which in this case is the thirty-second flip-flop in output register 23, is compared with its previous output by comparison circuit 47. Comparison circuit 47 comprises a shift register stage 48 which has its steering inputs connected to the outputs of the frame sync flip-flop in output register 23. During the occurrence of a gate pulse G, the output of the frame sync flip-flop is shifted into shift register stage 48 which stores it during the next frame. The output and the complement output of shift register stage 48 are connected to the inputs of AND gates 51 and 52, respectively. AND gates 51 and 52 also receive as inputs the output and complement output, respectively, of the frame sync flip-flop. OR gate 53 combines the outputs of AND gates 51 and 52 to produce the output signal C of camparison circuit 47. If the gate pulse G is in synchronism with the frame, both inputs of AND gates 51 and 52 will always be different since the frame sync pulse alternates between logical ONE and ZERO from frame to frame. As a result OR gate 53 will produce no output. If on the other hand gate pulse G is not in frame synchronization, an output C such as illustrated in FIG. 4 will occur and indicates a frame sync error.

AND gate 54 receives as two of its four inputs the clock pulse F and the output C of comparison circuit 47. Assuming for now that the other two inputs are present, AND gate 54 will produce an output pulse $F_i$. The output of AND gate 54 is connected to the inhibit input of AND gate 45. The occurrence of an $F_i$ pulse thus will prevent the clock pulse F from passing AND gate 45 and toggling the first stage of frequency divider 44. This results in the retardation of gate pulse G by one clock period. As a result, following this inhibited count, a second gate pulse occurs as shown in FIG. 4 which reloads the output register 23 with the rephased data stream. The new frame sync channel output is retained for the repeated comparison test of the next frame. The process is then repeated so that the frame synchronization circuit exhaustively examines each consecutive channel in the data stream until the one corresponding to the frame sync is found.

To insure that the rephasing cycle of gate pulse G occurs only once during any one frame period, a counter stage 55 is provided and has its output E connected to one of the other two inputs of AND gate 54. The input to counter stage 55 is supplied by AND gate 56 which has as its inputs the gate pulse G and clock pulse F. As may be seen from the pulse diagrams in FIG. 4, the first occurrence of both F and G toggles counter stage 55 producing the output E thereby enabling AND gate 54. Upon the second occurrence of both F and G, however, the counter stage 55 is toggled again thereby changing the output E to logical ZERO and inhibiting AND gate 54. Thus, frequency divider 44 is not inhibited from counting by the second gate pulse.

If the output of the frame sync channel has been observed to alternate in polarity from frame to frame for a large number of frames, there is strong justification to assume that the corresponding channel does indeed carry the synchronization signal. Under this condition, it is desirable to "bias" the frame synchronization circuit so that it ignores isolated single bit errors which may occur in the frame sync channel. To accomplish this, a frame sync error weighting circuit is provided. Included in the weighting circuit is a counter 57 which counts the number of frames for which a given channel is presented as the output of the frame sync channel. The number of stages in counter 57 depends upon the weighting factor desired. The first stage of counter 57 receives as its input the output of AND gate 58. The inputs to AND gate 58 are the gate pulse G and the complement of the last sampled output of the counter W. Assuming that the complement of W is logical ONE, then each time a gate pulse G is produced counter 57 will count. The output stage of counter 57 is sampled once each frame period by shift register stage 59 which has its shift input connected to the output of AND gate 56. If counter 57 achieves its total count, the complement of W becomes ZERO thereby inhibiting AND gate 58 and preventing any further counting by counter 57. The complement of W is also connected as the fourth input to AND gate 54; therefore, AND gate 54 will also be inhibited when the complement of W becomes ZERO thereby preventing rephasing of the gate pulse G when a frame sync error is detected by comparison circuit 47. Counter 57 will, however, be reset every time a frame sync error is detected. This done by connecting the output C of comparison circuit 47 to the reset input of each stage of counter 57. The occurrence of a second frame sync error before counter 57 is refilled will then result in rephasing of the gate pulse G.

It will be apparent that the embodiment shown is only exemplary and that various modifications can be made in construction and arrangement within the scope of the invention as defined in the appended claims.

We claim as our invention:

1. In the receiver of a pulse communication system, a bit synchronization circuit comprising:

a clock oscillator having a frequency greater than the pulse repetition rate of an incoming data stream, transition detector means for receiving the incoming data stream and detecting transitions therein, phase inverter means responsive to said transition detector means for directly receiving the entire output pulse train of said clock oscillator and shifting the phase thereof, frequency divider means for receiving the output of said phase inverter means and deriving an output having a variable frequency approximately instantaneously equal to the pulse repetition rate of the incoming data stream, and inhibiting means responsive to the output of said frequency divider means and said transition detector means for selectively inhibiting the input to said frequency divider means.

2. A bit synchronization circuit as recited in claim 1 wherein said transition detector means includes:

a first flip-flop settable by a ZERO to ONE transition in the incoming data stream, a second flip-flop settable by a ONE to ZERO transition in the incoming data stream, and an OR gate receiving and combining the outputs of said first and second flip-flops.

3. A bit synchronization circuit as recited in claim 2 wherein said phase inverter means includes:

a counter stage toggled in response to the detection of a data stream transition, first and second AND gates respectively connected to the output and complement output of said counter stage, said first and second AND gates also receiving the output and complement output, respectively, of said clock oscillator, and a second OR gate receiving and combining the outputs of said first and second AND gates.

4. A bit synchronization circuit as recited in claim 3 wherein said inhibiting means includes a third AND gate receiving the output of said frequency divider means and responsive to said transition detecting means and providing an output inhibiting signal when an output of said frequency divider means exists concurrently with a transition in the incoming data stream.

5. In the receiver of a time-division multiplex pulse communication system in which the transmitted data stream contains a periodically recurring frame sync pulse, a demultiplexer comprising:

a bit synchronization circuit as recited in claim 1, the output of said frequency divider means being the basic clock frequency for the demultiplexer, an input register serially receiving the incoming data stream in synchronization with said basic clock frequency, an output register having a plurality of stages equal in number to the number of transmitted data channels, gating means responsive to said basic clock frequency for gating in parallel the data in said input register into said output register once every frame period, and a frame synchronization circuit connected to the stage in said output register which corresponds to the assumed position of the frame sync pulse in the incoming data stream to detect an out-of-frame condition and perturbing said gating means when an out-of-frame condition is detected to thereby affect reframing of the incoming data stream.

6. A demultiplexer as recited in claim 5 wherein said gating means includes:

frequency divider means operable in response to the basic clock frequency for deriving a gating pulse recurring once every frame period, and a plurality of AND gates equal in number to the number of stages in said output register, each of said AND gates being connected between said input register and a respective stage of said output register, said AND gates being responsive to said gating pulse to gate the data in said input register into said output register.

7. A demultiplexer as recited in claim 6 wherein said frame sync pulse is the "winking" type occurring once every other frame, said frame synchronization circuit comprising:

a shift register stage having its inputs connected to the output and complement output of said output register stage corresponding to the assumed position of said frame sync pulse, said shift register stage further being reponsive to said gating pulse to assume the state of said output register stage, a fourth AND gate connected to the outputs of said output register stage and said shift register stage, a fifth AND gate connected to the complement outputs of said output register stage and said shift register stage, third OR gate receiving and combining the outputs of said fourth and fifth AND gates, and inhibiting means responsive to the output of said third OR gate for inhibiting the input of said frequency divider means one clock period.

8. A demultiplexer as recited in claim 7 further comprising: a weighting circuit means for counting the number of frames for which a given channel is presented as the output of the frame sync channel and biasing said frame synchronization circuit to ignore isolated out-of-frame indications when a predetermined number of frames have been counted without the detection of an out-of-frame condition.

References Cited

UNITED STATES PATENTS 3,102,164 8/1963 Roiz ---------------- 178—69.5

RALPH D. BLAKESLEE, Primary Examiner

U.S. Cl. X.R.

178—69.5; 325—41, 322